(12) United States Patent
Hamada et al.

(10) Patent No.: US 6,995,975 B2
(45) Date of Patent: Feb. 7, 2006

(54) ELECTRONIC APPARATUS COMPRISING KEYBOARD-MOUNTED HOUSING

(75) Inventors: Tomohiro Hamada, Ome (JP); Atsushi Tatemichi, Musashino (JP); Yasuyuki Horii, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/798,488

(22) Filed: Mar. 11, 2004

(65) Prior Publication Data

US 2004/0207976 A1 Oct. 21, 2004

(30) Foreign Application Priority Data

Mar. 11, 2003 (JP) .............................. 2003-064396

(51) Int. Cl.
*G06F 1/16* (2006.01)
(52) U.S. Cl. ....................... 361/680; 400/693; 361/683
(58) Field of Classification Search ................ 361/681, 361/683, 680, 686; 345/168; 248/917
See application file for complete search history.

(56) References Cited

U.S. PATENT DOCUMENTS

| 4,864,523 | A | 9/1989 | Sasaki |
| 5,335,141 | A | 8/1994 | Hosoi |
| 5,483,418 | A | 1/1996 | Hosoi |
| 5,689,400 | A | 11/1997 | Ohgami et al. |
| 5,808,860 | A | 9/1998 | Ohgami et al. |
| 5,808,861 | A | 9/1998 | Nakajima et al. |
| 6,198,626 | B1 | 3/2001 | Nakajima et al. |
| 6,262,883 | B1 * | 7/2001 | Kim ........................... 361/680 |
| 6,317,314 | B1 * | 11/2001 | Kung et al. .................. 361/680 |
| 6,610,944 | B2 | 8/2003 | Lee et al. |
| 6,661,650 | B2 | 12/2003 | Nakajima et al. |
| 2005/0040972 | A1 | 2/2005 | Hamada |
| 2005/0041378 | A1 | 2/2005 | Hamada |

FOREIGN PATENT DOCUMENTS

| JP | 05-053711 | 3/1993 |
| JP | 05-210725 | 8/1993 |
| JP | 06-187090 | 7/1994 |
| JP | 2002-182788 | 6/2002 |
| JP | 2002-196838 | 7/2002 |

* cited by examiner

*Primary Examiner*—Anatoly Vortman
*Assistant Examiner*—Zachary Pape
(74) *Attorney, Agent, or Firm*—Blakely Sokoloff Taylor & Zafman

(57) ABSTRACT

An electronic apparatus includes a housing having a mounting portion, an input device provided at the mounting portion, and a reinforcing plate configured to reinforce the mounting portion. The reinforcing plate has a frame and coupling portions surrounded by the frame. The coupling portions pass through a center of gravity of the reinforcing plate. A plurality of opening portions are provided between the frame and the coupling portions.

13 Claims, 9 Drawing Sheets

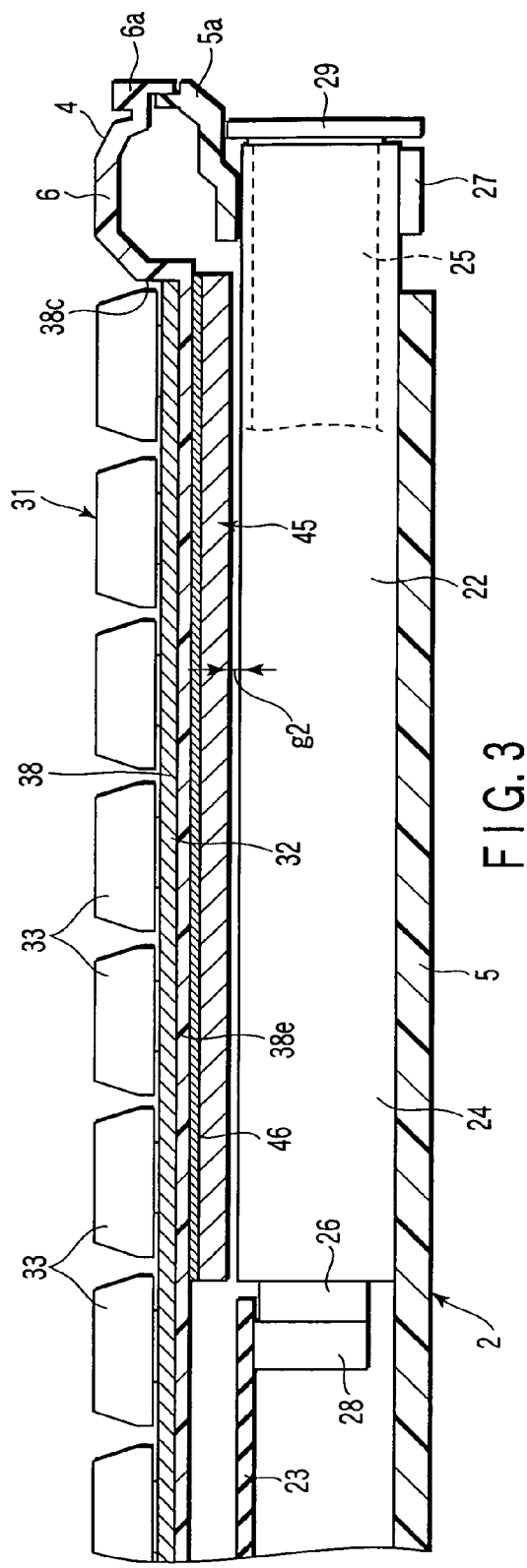
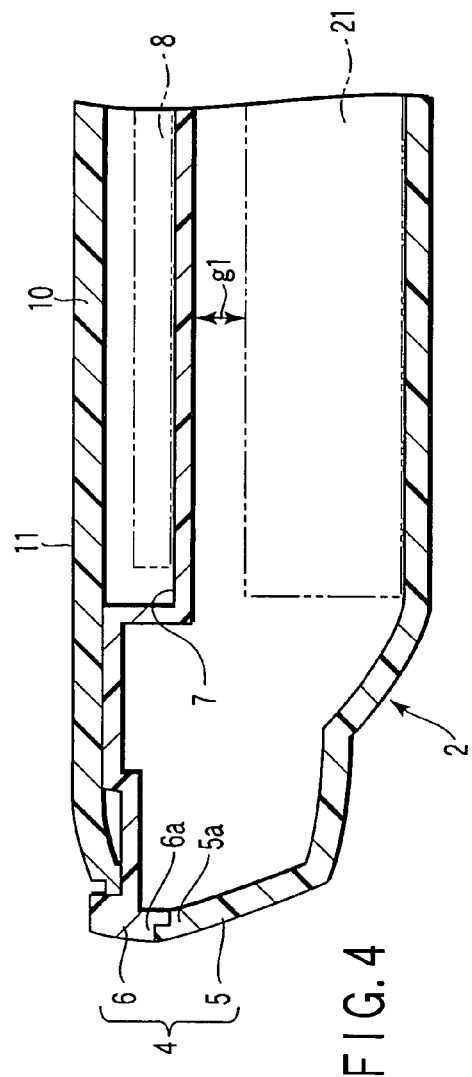
FIG. 3
FIG. 4

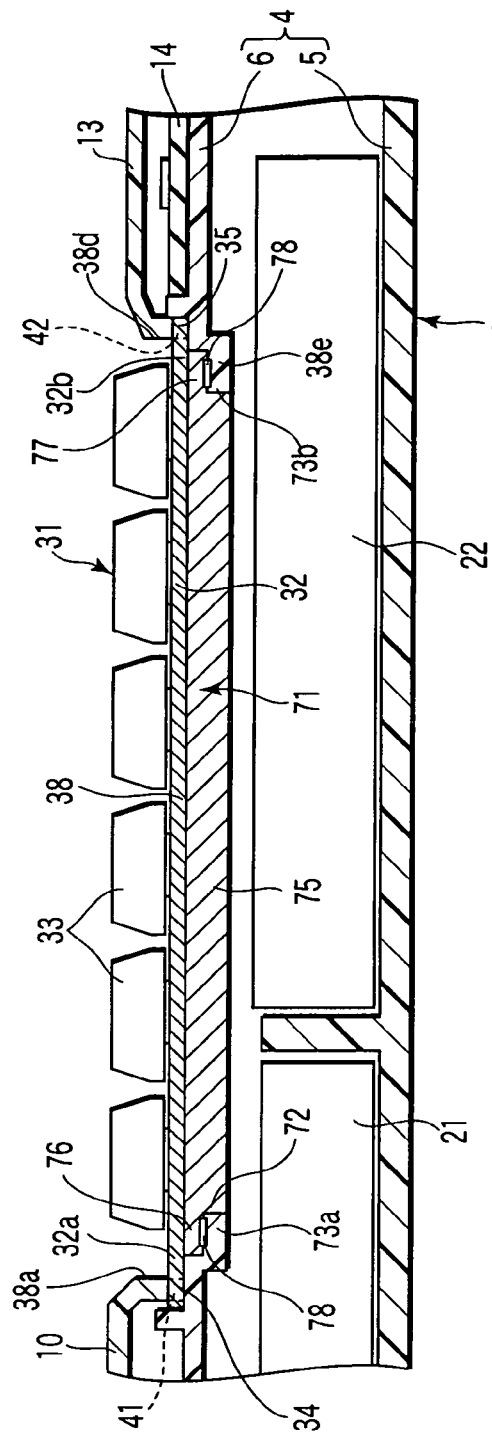
F I G. 9
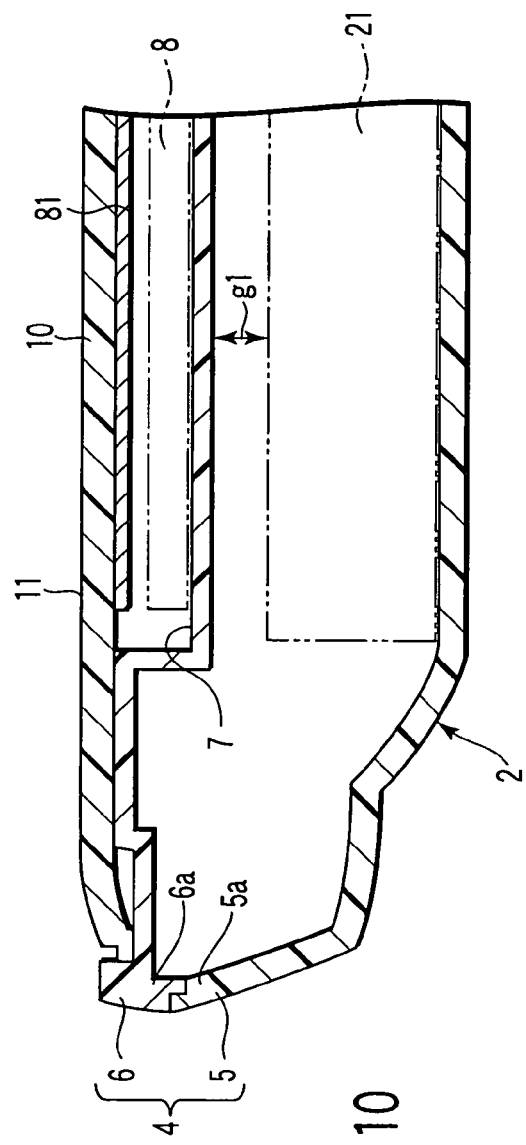
F I G. 10

ELECTRONIC APPARATUS COMPRISING KEYBOARD-MOUNTED HOUSING

CROSS-REFERENCE TO RELATED APPLICATIONS

This application is based upon and claims the benefit of priority from prior Japanese Patent Application No. 2003-64396, filed Mar. 11, 2003, the entire contents of which are incorporated herein by reference.

BACKGROUND OF THE INVENTION

1. Field of the Invention

This invention relates to an electronic apparatus such as a portable computer comprising a keyboard and, more particularly, to a structure for reinforcing a housing supporting a keyboard.

2. Description of the Related Art

An electronic apparatus such as a notebook-type portable computer comprises a housing formed of synthetic resin to support the keyboard. The housing comprises a keyboard-mounting portion opening to a top face of the housing. The keyboard comprises a plate-like keyboard base and a plurality of key tops. The keyboard base is fitted in the keyboard-mounting portion. The key tops are supported by the keyboard base and exposed to the top face of the housing.

The housing accommodates computer modules such as an optical disk drive and a battery pack. The computer modules are positioned under the keyboard-mounting portion to face the keyboard base.

Recently, the electronic apparatus has been designed to be thin and compact to increase portability. In accordance with this, the housing is inclined to be thin. Some of the housings are so thin that they are bent when they are pushed by a fingertip. The thickness of the keyboard is also reduced in accordance with the thinness of the housing. If the keyboard base is thinner, the rigidity of the keyboard base is reduced. For this reason, the keyboard base is bent by an impulse caused when the key top is pushed down by a fingertip.

As the housing becomes thinner, a gap between the keyboard base and the computer modules becomes smaller. If the keyboard base is bent under these circumstances, the keyboard base may contact the computer modules. As a result, the impulse may be applied to the computer modules and may cause malfunctions and breakage in the computer modules.

To prevent the impulse, a support wall is provided at the keyboard-mounting portion of the housing, in an electronic apparatus disclosed in, for example, Jpn. Pat. Appln. KOKAI Publication No. 2002-182788 or Jpn. Pat. Appln. KOKAI Publication No. 2002-196838. The support wall is provided between the keyboard and the computer modules to support the keyboard base from a lower side.

In this structure, a space including the support wall is needed between the keyboard and the computer modules. For this reason, the support wall is desired to be as thin as possible to restrict the thickness of the housing. However, if the support wall is made to be thinner, the rigidity of the support wall is lost. As a result, if the key tops are operated with a strong force, its impulse may bend the support wall. The support wall may contact the computer modules and application of the impulse to the computer modules cannot be prevented.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a cross-sectional view of the portable computer according to the first embodiment, illustrating a relationship of position among the keyboard-mounting portion, the keyboard and an optical disk drive;

FIG. 4 is a cross-sectional view of the portable computer according to the first embodiment, illustrating a relationship of position among an upper casing, a lower casing and a first cover;

FIG. 9 is a cross-sectional view of the portable computer according to a third embodiment of the present invention, illustrating a relationship of position among the keyboard-mounted portion, the keyboard and an optical disk drive;

FIG. 10 is a cross-sectional view of the portable computer according to a fourth embodiment of the present invention, illustrating a relationship of position between a palm rest and the reinforcing plate in the housing;

DETAILED DESCRIPTION OF THE INVENTION

A first embodiment of the present invention will be described below with reference to FIG. 1 to FIG. 7.

Figure 1:
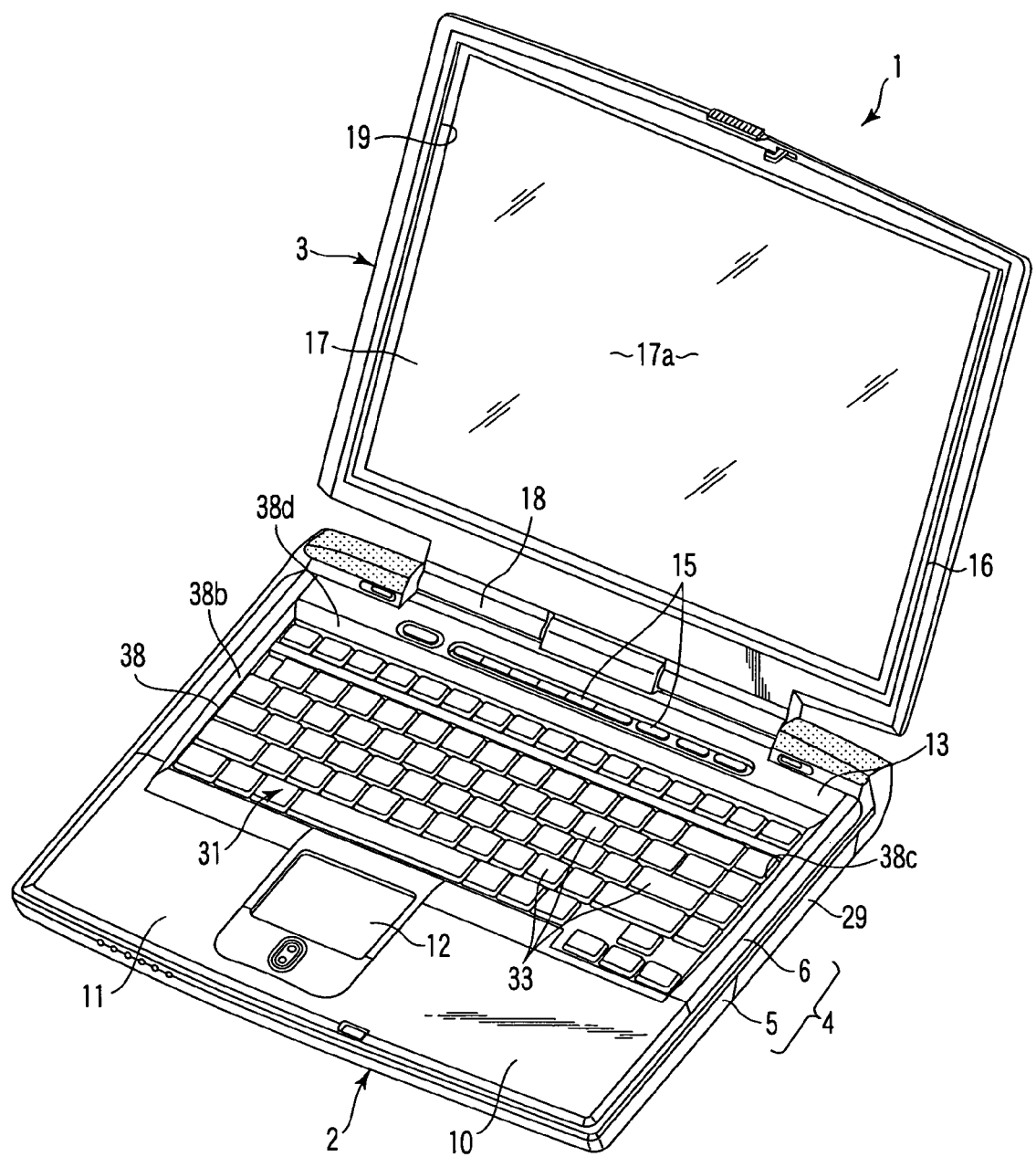
FIG. 1 is a perspective view of a portable computer according to a first embodiment of the present invention.
Figure 2:
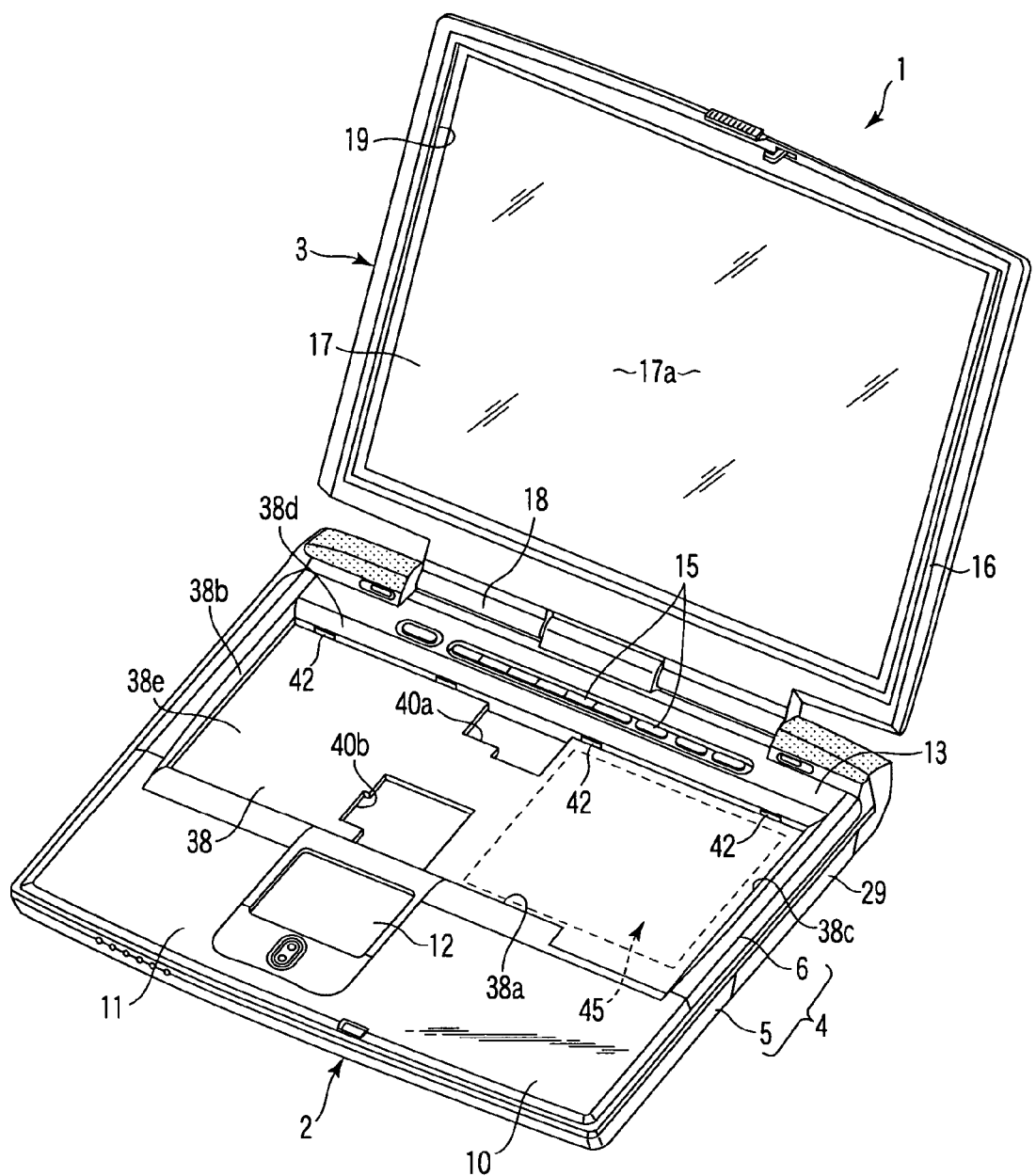
FIG. 2 is a perspective view of the portable computer according to the first embodiment, illustrating detachment of a keyboard from a keyboard-mounting portion of a housing.

FIGS. 1 to 3 show a notebook-type portable computer serving as an electronic apparatus. The portable computer 1 comprises a main unit 2 and a display unit 3. The main unit 2 has a housing 4 formed of synthetic resin. The housing 4 comprises a lower casing 5 and an upper casing 6. The lower casing 5 and the upper casing 6 have outer peripheral edges 5a and 6a, respectively. The outer peripheral edge 6a of the upper casing 6 is engaged with the outer peripheral edge 5a of the lower casing 5. Thus, the upper casing 6 is laid on the lower casing 5 to cover the lower casing 5.

A recess portion 7 is formed on a top surface of a front half portion of the upper casing 6 as shown in FIG. 4. For example, the recess portion 7 accommodates a circuit board 8. A first cover 10 formed of synthetic resin is attached to the front half portion of the upper casing 6. The first cover 10 covers the recess portion 7 and the circuit board 8. The first cover 10 serves as a palm rest 11. A touch pad 12 which is a kind of pointing devices is provided at a central portion of the palm rest 11.

Figure 5:
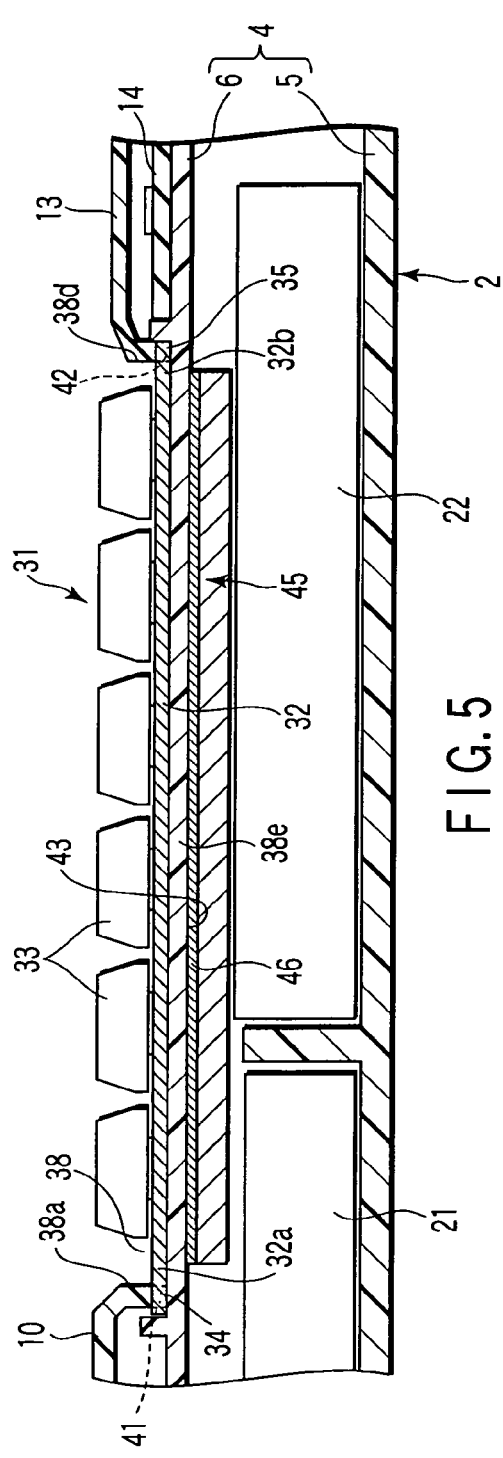
FIG. 5 is a cross-sectional view of the portable computer according to the first embodiment, illustrating fixation of the keyboard to the keyboard-mounting portion.

A second cover 13 formed of synthetic resin is attached to a rear end of the upper casing 6 as shown in FIGS. 1 and 5. The second cover 13 covers a switch board 14 attached to a top surface of the rear end of the upper casing 6. The second cover 13 has a plurality of operation buttons 15. The operation buttons 15 are provided to turn ON/OFF a plurality of switches (not shown) on the switch board 14 and aligned along a width direction of the hosing 4.

The display unit 3 comprises a display housing 16 and an LCD (liquid crystal display) panel 17. The display housing 16 is designed in a flat box shape and has feet 18 on its lower end. The display housing 16 accommodates the LCD panel 17. The LCD panel 17 has a screen 17a configured to display information. The screen 17a is exposed to the outside of the display unit 3 through an opening portion 19 formed at a front surface of the display housing 16.

The feet 18 of the display housing 16 are coupled to a rear end of the housing 4 via hinges (not shown). The display unit 3 can be pivoted between a closing position and an opening position by this coupling. The display unit 3, at the closing position, lies on the main unit 2 to cover the upper casing 6, the first cover 10 and the second cover 13 from above. The display unit 3, at the opening position, stands up to expose the upper casing 6, the first cover 10 and the second cover 13.

The housing 4 of the main unit 2 accommodates a battery pack 21, an optical disk drive 22 and a printed circuit board 23 as shown in FIGS. 3 to 5. The battery pack 21 and the optical disk drive 22 are aligned in a depth direction of the housing 4. The battery pack 21 is positioned just below the recess portion 7 of the upper casing 6. A first gap g1 is formed between the recess portion 7 and the battery pack 21.

The optical disk drive 22 comprises a main body 24 shaped in a flat box and a tray 25. The main body 24 is supported by the lower casing 5 to be taken out at a position tilting toward the right side from the central portion of the housing 4. The main body 24 has a connector 26 and an engagement portion 27. The connector 26 is positioned at one end of the main body 24 and connected to a connector receptacle 28 mounted on the printed circuit board 23. A fingertip is caught on the engagement portion 27 when the optical disk drive 22 is taken out of the housing 4. The engagement portion 27 is positioned on an opposite side of the connector 26.

The tray 25 is configured to accommodate a disk-shaped media in the main body 24 and supported by the main body 24 so as to be slidable. The tray 25 has a panel 29. The panel 29 is positioned on one end of the tray 25 and exposed to the right side of the housing 4. Thus, the tray 25 can be pulled out toward the right side of the housing 4.

The housing 4 supports a keyboard 31 serving as an input device as shown in FIGS. 1, 3 and 5. The keyboard 31 has a keyboard base 32 and a plurality of key tops 33. The keyboard base 32 is formed of a metal plate. The keyboard base 32 has an elongated shape extending in a width direction of the housing 4, and comprises a front edge 32a and a rear edge 32b.

A plurality of first engaging projections 34 (only one of them shown in FIG. 5) are formed at the front edge 32a of the keyboard base 32. The first engaging projections 34 are aligned along a lengthwise direction of the keyboard base 32 and spaced from each other with an interval. Similarly to this, a plurality of second engaging projections 35 (only one of them shown in FIG. 5) are formed at the rear edge 32b of the keyboard base 32. The second engaging projections 35 are also aligned along a lengthwise direction of the keyboard base 32 and spaced from each other with an interval.

The key tops 33 are supported on a top surface of the keyboard base 32. The key tops 33 are pushed down by fingertips when information is input. For this reason, when the key tops 33 are pushed down with a strong force, the keyboard base 32 receives a strong impulse.

The upper casing 6 of the housing 4 has a keyboard-mounting portion 38 to receive the keyboard 31 as shown in FIGS. 2, 3 and 5. The keyboard-mounting portion 38 is a recess corresponding to the keyboard 31 and opens to the top surface of the upper casing 6. The keyboard-mounting portion 38 is positioned between the first cover 10 and the second cover 13.

To describe more details, the keyboard-mounting portion 38 has a front wall 38a, a left side wall 38b, a right side wall 38c, a rear wall 38d, and a bottom wall 38e. The side walls 38b and 38c, and the bottom wall 38e are formed on the upper casing 6. The side walls 38b and 38c extend downwardly from the side edges of the upper casing 6 and are arranged on the opposite sides along the width direction of the housing 4. The bottom wall 38e is extended between lower ends of the side walls 38b and 38c. The bottom wall 38e supports the keyboard base 32 from its bottom side. A right half portion of the bottom wall 38e is positioned just above the optical disk drive 22. In other words, the right half portion of the bottom wall 38e is sandwiched between the keyboard 31 and the optical disk drive 22.

The bottom wall 38e has a pair of openings 40a and 40b at positions displaced from the optical disk drive 22. The LCD panel 17 and the printed circuit board 23 are electrically connected by a cable (not shown) passing through the opening 40a. The keyboard 31 and the printed circuit board 23 are electrically connected by the other cable (not shown) passing through the opening 40b.

The front wall 38a extends downwardly from the rear edge of the first cover 10 as shown in FIG. 5. A lower end of the front wall 38a abuts on the front end of the bottom wall 38e. A plurality of first engagement apertures 41 (one of them shown) are formed at a corner portion formed by the bottom wall 38e and the lower end of the front wall 38a. The first engagement apertures 41 correspond to the first engaging projections 34 of the keyboard 31. The first engagement apertures 41 are aligned along the width direction of the housing 4 and spaced from each other with an interval. The rear wall 38d extends downwardly from the front edge of the second cover 13. A lower end of the rear wall 38d abuts on the rear end of the bottom wall 38e. A plurality of second engagement apertures 42 are formed at a corner portion formed by the bottom wall 38e and the lower end of the rear wall 38d. The second engagement apertures 42 correspond to the second engaging projections 35 of the keyboard 31. The second engagement apertures 42 are aligned along the width direction of the housing 4 and spaced from each other with an interval.

The keyboard 31 is mounted to the keyboard-mounting portion 38 in the following manner. The second cover 13 is preliminarily detached from the upper casing 6 before the keyboard 31 is mounted to the keyboard-mounting portion 38. In this state, the front edge 32a of the keyboard base 32 is led to the keyboard-mounting portion 38 from the top of the housing 4 and the first engaging projections 34 of the keyboard base 32 are inserted into the first engagement apertures 41.

Next, the keyboard base 32 is pivoted downwardly with the engaging portions of the first engaging projections 34 and the first engagement apertures 41 serving as a fulcrum. Then the keyboard 15 is mounted down on the keyboard-mounting portion 38. Thus, the keyboard base 32 overlaps the bottom wall 38e of the keyboard-mounting portion 38. Next, the second cover 13 is fixed to cover the upper casing 6. As a result, the second engagement apertures 42 are formed at the corner portion formed by the bottom wall 38e and the rear wall 36d, and the second engaging projections 35 of the keyboard base 32 are retained in a state of entering the second engagement apertures 42. Thus, the rear edge 32b of the keyboard base 32 is sandwiched between the bottom wall 38e and the rear wall 38d. The keyboard 31 is thereby fixed to the keyboard-mounting portion 38.

Before fixing the second cover 13 to the upper casing 6, the rear edge 32b of the keyboard base 32 may be fixed to the bottom wall 38e with a plurality of screws.

To make the housing 4 thinner, the thickness of the bottom wall 38e is reduced to the minimum limit. The bottom wall 38e has an inner surface 43 located inside the housing 4. A reinforcing plate 45 is attached to the inner surface 43 of the bottom wall 38e. The reinforcing plate 45 receives the impulse applied to the bottom wall 38e from the keyboard base 32 when the key tops 33 are operated. Deflection of the bottom wall 38e can be thereby prevented.

Figure 6:
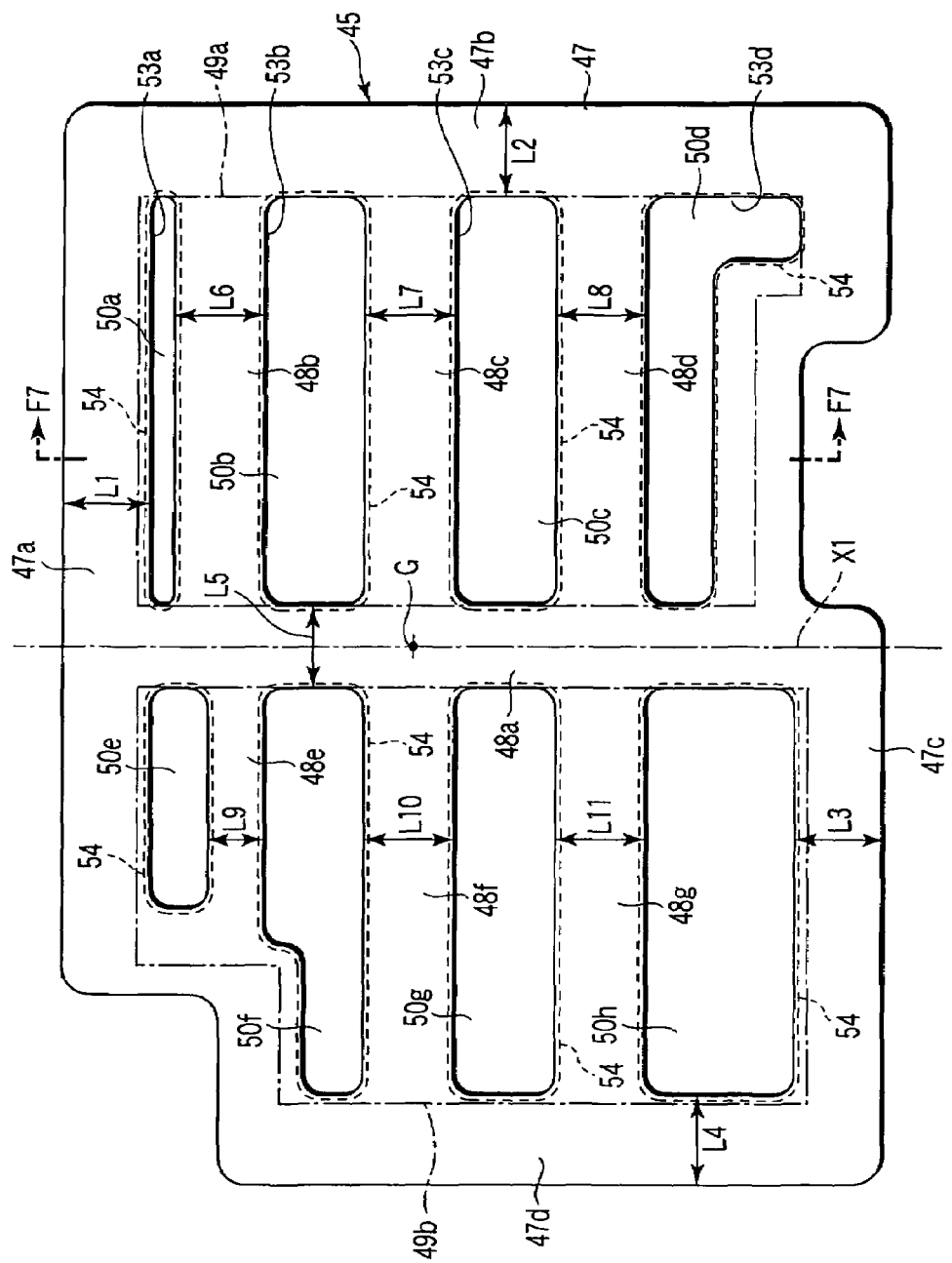
FIG. 6 is a plan view of a reinforcing plate according to the first embodiment.

The reinforcing plate 45 has a square shape which is large enough to correspond to the optical disk drive 22 as shown in FIG. 6, and is formed of a metal material such as an aluminum alloy. The reinforcing plate 45 applied to the inner surface 43 of the bottom wall 38e by a bonding member 46 such as a double-faced tape or a bonding agent. For this reason, the inner surface 43 of the bottom wall 38e is stacked on the reinforcing plate 45 and the reinforcing plate 45 is sandwiched between the bottom wall 38e and the optical disk drive 22. A second gap g2 is formed between the reinforcing plate 45 and the optical disk drive 22.

FIG. 6 is a plan view of the reinforcing plate 45. The reinforcing plate 45 comprises a frame 47, and first to seventh coupling portions 48a to 48g located inside the frame 47. The frame 47 has first to fourth edges 47a to 47d. The first edge 47a and the third edge 47c are extended along the width direction of the housing 4 and arranged parallel to each other. The second edge 47b and the fourth edge 47d are extended along the depth direction of the housing 4 and arranged parallel to each other.

The first coupling portion 48a is shaped in a band coupling the first edge 47a and the third edge 47c. The first coupling portion 48a is located between the second edge 47b and the fourth edge 47d and arranged parallel to the second edge 47b and the fourth edge 47d. The first coupling portion 48a is extended along a straight line X1 passing at a center of gravity G of the reinforcing plate 45. The center of gravity G is located at an approximately central portion of the reinforcing plate 45 which is surrounded by the first to fourth edges 47a to 47d. The reinforcing plate 45 is sectioned into a first opening region 49a and a second opening region 49b by the first coupling portion 48a.

The second coupling portion 48b to the fourth coupling portions 48d are located inside the first opening region 49a of the reinforcing plate 45. Each of the second coupling portion 48b to the fourth coupling portions 48d is shaped in a band coupling the first coupling portion 48a and the second edge 47b. The second coupling portion 48b to the fourth coupling portions 48d are located between the first edge 47a and the third edge 47c, arranged parallel to each other and spaced from each other with an interval.

First to fourth opening portions 50a to 50d are formed inside the first opening region 49a of the reinforcing plate 45. Each of the opening portions 50a to 50d is shaped in a slit extending along the second to fourth coupling portions 48b to 48d. The opening portions 50a to 50d are aligned and spaced from each other with an interval. To describe in detail, the first opening portion 50a is defined as a portion surrounded by the first edge 47a, the second edge 47b, the first coupling portion 48a and the second coupling portion 48b. The second opening portion 50b is defined as a portion surrounded by the first coupling portion 48a, the second coupling portion 48b, the second edge 47b and the third coupling portion 48c. The third opening portion 50c is defined as a portion surrounded by the first coupling portion 48a, the third coupling portion 48c, the second edge 47b and the fourth coupling portion 48d. The fourth opening portion 50d is defined as a portion surrounded by the first coupling portion 48a, the fourth coupling portion 48d, the second edge 47b and the third edge 47c.

The first to fourth edges 47a to 47d have widths L1 to L4, respectively. The first to fourth coupling portions 48a to 48d have widths L5 to L8, respectively. The widths L1 to L4 of the edges 47a to 47d and the widths L5 to L8 of the coupling portions 48a to 48d are equal to each other. This means that the first to fourth opening portions 50a to 50d located inside the first opening region 49a are spaced with an equal interval.

The fifth coupling portion 48e to the seventh coupling portions 48g are located inside the second opening region 49b of the reinforcing plate 45. Each of the fifth coupling portion 48e to the seventh coupling portions 48e is shaped in a band coupling the first coupling portion 48a and the fourth edge 47d. The fifth coupling portion 48e to the seventh coupling portions 48g are located between the first edge 47a and the third edge 47c, arranged parallel to each other and spaced from each other with an interval.

Fifth to eighth opening portions 50e to 50h are formed inside the second opening region 49b of the reinforcing plate 45. Each of the opening portions 50e to 50h is shaped in a slit extending along the fifth to seventh coupling portions 48e to 48h. The opening portions 50e to 50h are aligned and spaced from each other with an interval. To describe in detail, the fifth opening portion 50e is defined as a portion surrounded by the first edge 47a, the fourth edge 47d, the fifth coupling portion 48e and the first coupling portion 48a. The sixth opening portion 50f is defined as a portion surrounded by the first coupling portion 48a, the fifth coupling portion 48e, the fourth edge 47d and the sixth coupling portion 48f. The seventh opening portion 50g is defined as a portion surrounded by the first coupling portion 48a, the sixth coupling portion 48f, the fourth edge 47d and the seventh coupling portion 48g. The eighth opening portion 50h is defined as a portion surrounded by the first coupling portion 48a, the seventh coupling portion 48g, the fourth edge 47d and the third edge 47c.

The fifth to seventh coupling portions 48e to 48g have widths L9 to L11, respectively. The widths L9 to L11 of the coupling portions 48e to 48h are approximately equal to the widths L5 to L8 of the coupling portions 48a to 48d. This means that the fifth to eighth opening portions 50e to 50h located inside the second opening region 49b are spaced with an approximately equal interval. In addition, the coupling portions 48a to 48d inside the first opening region 49a and the opening portions 50e to 50h inside the second opening region 49b are arranged symmetrically with the first coupling portion 48a.

Thus, the first to eighth opening portions 50a to 50h are surrounded by the frame 47 and sectioned by the first to seventh coupling portions 48a to 48g. The first to eighth opening portions 50a to 50h are displaced from the center of gravity G of the reinforcing plate 45.

Figure 7:
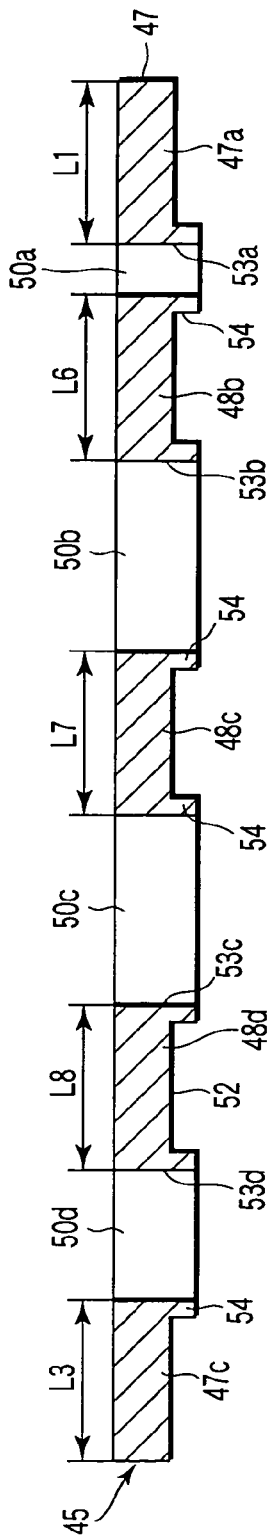
FIG. 7 is a cross-sectional view of the reinforcing plate as seen along a line F7—F7 of FIG. 6.

The reinforcing plate 45 has a back surface 52 facing the optical disk drive 22 as shown in FIG. 7. The first to fourth opening portions 50a to 50d have opening edges 53a to 53d which open to the back surface 52, respectively. A projecting portion 54 is formed at each of the opening edges 53a to 53d of the first to fourth opening portions 50a to 50d. The projecting portion 54 projects from the back surface 52 of the reinforcing plate 45 and is continuous in a peripheral direction of each of the first to fourth opening portions 50a to 50d. The projecting portion 54 is also formed at each of opening edges of the fifth to eighth opening portions 50e to 50h.

The reinforcing plate 45 is formed by shearing a metal material and punching the first to eighth opening portions 50a to 50h in the metal material. The projecting portion 54 is formed by bending the opening edges 53a to 53d of the reinforcing plate 45 in a flange shape when the opening portions 50a to 50h are punched. The projecting portion 54 may not be continuous in the peripheral direction of the first to eighth opening portions 50a to 50h, but on a part of each of the opening portions 50a to 50h. The rigidity of the reinforcing plate 45 is increased by the presence of the projecting portions 54.

In the first embodiment, when the key tops 33 of the key board 31 are operated, the impulse caused by the operation is transmitted to the bottom wall 38e from the keyboard 32 and also transmitted to the reinforcing plate 45 from the bottom wall 38e. At this time, the impulse is most transmitted to the central portion of the reinforcing plate 45. The center of gravity G of the reinforcing plate 45 is arranged at the central portion of the reinforcing plate 45. The first coupling portion 48a crosses over the center of gravity G. The first to eighth opening portions 50a to 50h which contribute to the reduction of the weight of the reinforcing plate 45 are arranged symmetrically with the first coupling portion 48a and displaced from the center of gravity G of the reinforcing plate 45.

For this reason, the rigidity of the reinforcing plate 45 can be maintained and the impulse transmitted from the keyboard 31 can be certainly received by the reinforcing plate 45 while reducing the weight of the reinforcing plate 45. As a result, the deflection of the bottom wall 38e can be prevented when the key tops 33 of the keyboard 31 are operated.

In other words, the second gap g2 between the reinforcing plate 45 and the optical disk device 22 can be maintained. Thus, the reinforcing plate 45 does not contact the optical disk drive 22 located below the reinforcing plate 45 and the impulse is not transmitted to the optical disk drive 22.

Moreover, the keyboard 31 can be supported by the bottom wall 38e which is located below the keyboard 31. For this reason, the feeling of operating the key tops 33 with fingertips becomes preferable and the operability of the keyboard 31 is improved.

Figure 8:
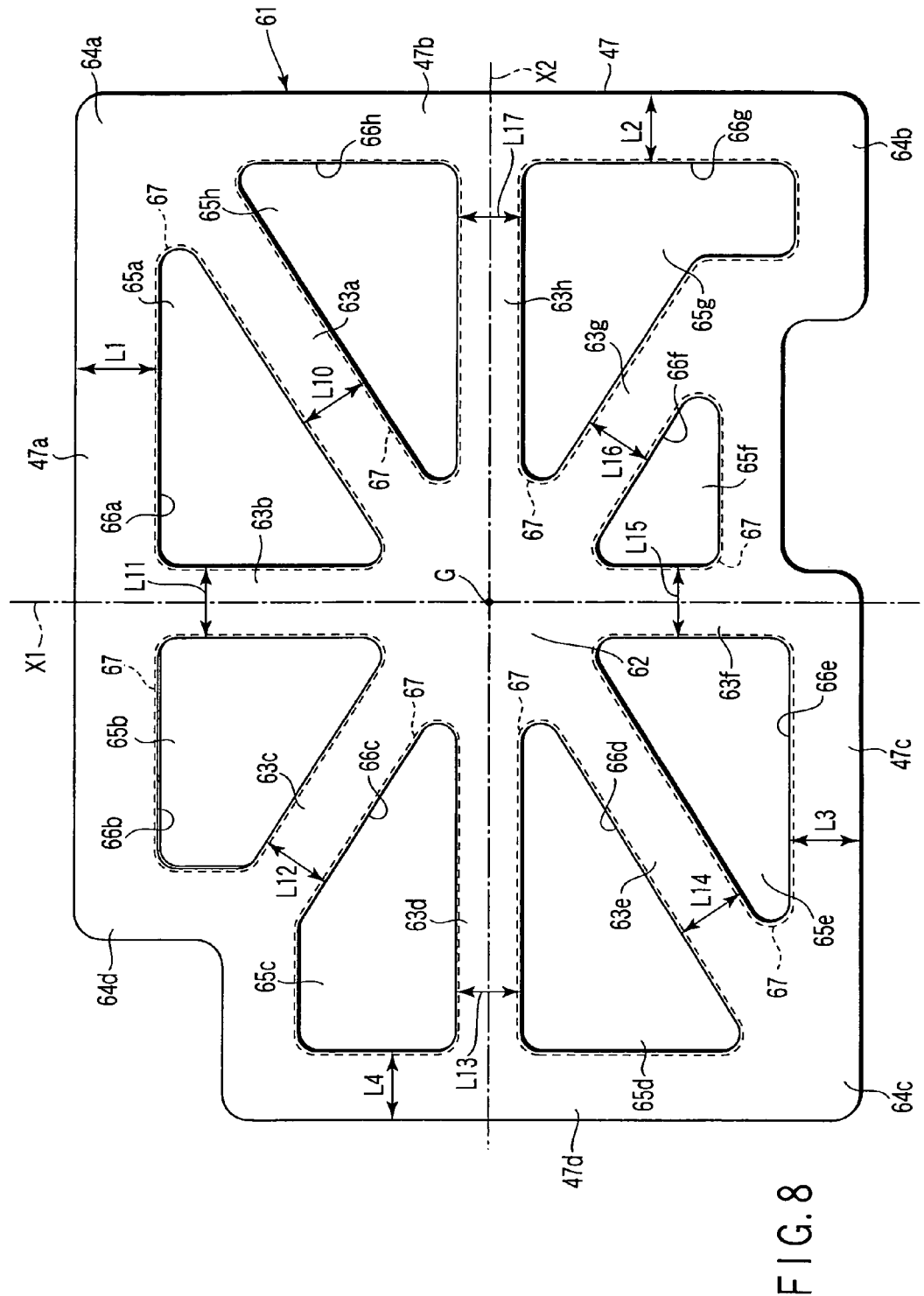
FIG. 8 is a plan view of a reinforcing plate according to a second embodiment of the present invention.

FIG. 8 shows a reinforcing plate 61 according to a second embodiment of the present invention.

The reinforcing plate 61 is formed of a metal material such as an aluminum alloy. An outer shape of the reinforcing plate 61 is similar to that of the reinforcing plate 45 of the first embodiment. The reinforcing plate 61 has the frame 47, a central portion 62 surrounded by the first to fourth edges 47a to 47d of the frame 47, and first to eighth coupling portions 63a to 63h extending radially from the central portion 62 to the frame 47.

The frame 47 has first to fourth corner portions 64a to 64d. The first corner portion 64a is defined by the first edge 47a and the second edge 47b. The second corner portion 64b is defined by the second edge 47b and the third edge 47c. The third corner portion 64c is defined by the third edge 47c and the fourth edge 47d. The fourth corner portion 64d is defined by the fourth edge 47d and the first edge 47a. The central portion 62 is located at the center of gravity G of the reinforcing plate 61. The center of gravity G is approximately located at the center of the reinforcing plate 61.

The first coupling portion 63a couples the central portion 62 and the first corner portion 64a. The second coupling portion 63b couples the central portion 62 and the first edge 47a. The second coupling portion 63b is arranged parallel to the edges 47b and 47d. The third coupling portion 63c couples the central portion 62 and the fourth corner portion 64d. The fourth coupling portion 63d couples the central portion 62 and the fourth edge 47d. The fourth coupling portion 63d is arranged parallel to the edges 47a and 47c. The fifth coupling portion 63e couples the central portion 62 and the third corner portion 64c. The sixth coupling portion 63f couples the central portion 62 and the third edge 47c. The sixth coupling portion 63f is arranged parallel to the edges 47b and 47d. The seventh coupling portion 63g couples the central portion 62 and the second corner portion 64b. The eighth coupling portion 63h couples the central portion 62 and the second edge 47b. The eighth coupling portion 63h is arranged parallel to the edges 47a and 47c.

The reinforcing plate 61 has two straight lines X1 and X2 passing through the center of gravity G and intersecting each other as shown in FIG. 8. The second coupling portion 63b and the sixth coupling portion 63f are aligned along the straight line X1. The fourth coupling portion 63d and the eighth coupling portion 63h are aligned along the straight line X2.

The first to eighth coupling portions 63a to 63h have widths L10 to L17, respectively. The widths L10 to L17 of the coupling portions 63a to 63h are approximately the same as the widths L1 to L4 of the edges 47a to 47d.

The reinforcing plate 61 also has first to eighth opening portions 65a to 65h. The first opening portion 65a is defined as a triangular region surrounded by the first edge 47a, the first coupling portion 63a and the second coupling portion 63b. The second opening portion 65b is defined as an approximately triangular region surrounded by the first edge 47a, the second coupling portion 63b and the third coupling portion 63c. The third opening portion 65c is defined as an approximately triangular region surrounded by the third coupling portion 63c, the fourth edge 47d and the fourth coupling portion 63d. The fourth opening portion 65d is defined as a triangular region surrounded by the fourth edge 47d, the fourth coupling portion 63d and the fifth coupling portion 63e. The fifth opening portion 65e is defined as a triangular region surrounded by the fifth coupling portion 63e, the third edge 47c and the sixth coupling portion 63f. The sixth opening portion 65f is defined as a triangular region surrounded by the sixth coupling portion 63f, the third edge 47c and the seventh coupling portion 63g. The seventh opening portion 65g is defined as an approximately triangular region surrounded by the seventh coupling portion 63g, the second edge 47b and the eighth coupling portion 63h. The eighth opening portion 65h is defined as a triangular region surrounded by the eighth coupling portion 63h, the second edge 47b and the first coupling portion 63a. Thus, the first to eighth opening portions 65a to 65h are sectioned with an approximately equal interval by the first to eighth coupling portions 63a to 63h and arranged radially from the central portion 62 at which the center of gravity G is located.

The first to eighth opening portions 65a to 65h have opening edges 66a to 66h opening to the back surface of the reinforcing plate 61, respectively. A projecting portion 67 is formed at each of the opening edges 66a to 66h. The projecting portion 67 projects from the back surface of the reinforcing plate 61 and is continuous in a peripheral direction of each of the first to eighth opening portions 65a to 65h.

The reinforcing plate 61 is formed by shearing a metal material and punching the first to eighth opening portions 65a to 65h in the metal material. The projecting portion 67 is formed by bending the opening edges 66a to 66h of the reinforcing plate 61 in a flange shape when the opening portions 65a to 65h are punched.

In the second embodiment, the first to eighth coupling portions 63a to 63h are extended radially from the central portion 62 at which the center of gravity C of the reinforcing plate 61 is located. In addition, the second coupling portion 63b, the sixth coupling portion 63f and the central portion 62 are located in the straight line X1 which passes through the center of gravity G. Similarly, the fourth coupling portion 63d, the eighth coupling portion 63h and the central portion 62 are located in the straight line X2 which passes through the center of gravity G. Thus, the central portion 62 at which the center of gravity G is located becomes large and the rigidity of the reinforcing plate 61 is increased. Therefore, the impulse transmitted from the keyboard 31 can be certainly received by the reinforcing plate 61 while reducing the weight of the reinforcing plate 61.

FIG. 9 shows a third embodiment of the present invention.

The third embodiment is different from the first embodiment in view of a feature relating to the keyboard-mounting portion 38 and a reinforcing plate 71. The structure of the display unit 2 other than this feature is similar to that of the first embodiment. Thus, elements like or similar to those disclosed in the first embodiment are denoted by similar reference numbers and are not described in detail here.

The bottom wall 38e of the keyboard-mounting portion 38 has an opening portion 72 opening toward the lower casing 5 as shown in FIG. 9. In other words, the bottom wall 38e has a first extending portion 73a and a second extending portion 73b which define the opening portion 72. The first extending portion 73a is located at the front end of the keyboard-mounting portion 38 and extends toward the opening portion 72. The second extending portion 73b is located at the rear end of the keyboard-mounting portion 38 and extends toward the opening portion 72.

The reinforcing plate 71 comprises a main body 75 fitted in the opening portion 72, a first flange 76 projecting from a front edge of the main body 75, and a second flange 77 projecting from a rear edge of the main body 75. The first flange 76 is fixed on the first extending portion 73a via a bonding agent 78. Similarly, the second flange 77 is fixed on the second extending portion 73b via the bonding agent 78. By this fixation, the reinforcing plate 71 becomes integral with the keyboard-mounting portion 38. The keyboard base 32 of the keyboard 31 is directly stacked on the reinforcing plate 71.

In the third embodiment, the main body 75 of the reinforcing plate 71 may have the first to eighth opening portions 50a to 50h similarly to the reinforcing plate 45 of the first embodiment or the first to eighth opening portions 65a to 65h similarly to the reinforcing plate 61 of the second embodiment. Explanations of this matter are omitted here.

In this structure, the impulse transmitted from the keyboard 31 can be directly received by the reinforcing plate 71 when the keyboard 31 is operated. For this reason, the keyboard-mounting portion 38 can be reinforced with the lightweight reinforcing plate 71.

FIG. 10 shows a fourth embodiment of the present invention.

The fourth embodiment is different from the first embodiment in view of a feature of reinforcing the palm rest 11 of the housing 4 with a reinforcing plate 81. The structure of the main unit 2 other than this feature is the same as that in the first embodiment. Thus, elements like or similar to those disclosed in the first embodiment are denoted by similar reference numbers and are not described in detail here.

The reinforcing plate 81 is formed of a metal material such as an aluminum alloy. The reinforcing plate 81 may have the first to eighth opening portions 50a to 50h similarly to the reinforcing plate 45 of the first embodiment or the first to eighth opening portions 65a to 65h similarly to the reinforcing plate 61 of the second embodiment. Explanations of this matter are omitted here. The reinforcing plate 81 is applied to the inner surface of the first cover 10 with a double-faced tape or a bonding agent. For this reason, the reinforcing plate 81 is exposed to the recess portion 7 of the upper casing 6 and faces the circuit board 8 accommodated in the recess portion 7.

The palm rest 11 is a place on which the operator operating the keyboard 31 places his or her hands. The downward pressure is always applied to the palm rest 11 when the operator operates the keyboard 31. If the rigidity of the first cover 10 is reduced in accordance with reduction of the thickness of the first cover 10, the first cover 10 is bent by the applied pressure. As a result, the first cover 10 contacts the circuit board 8 and the stress is applied to the circuit board 8.

In the structure of the fourth embodiment, the first cover 10 can be reinforced from the inner side of the housing 4 by the lightweight reinforcing plate 81. For this reason, the bending of the first cover 10 can be prevented mainly when the keyboard 31 is operated. In addition, the first cover 10 is not caused to contact the circuit board 8 or no stress is applied to the circuit board 8.

Figure 11:
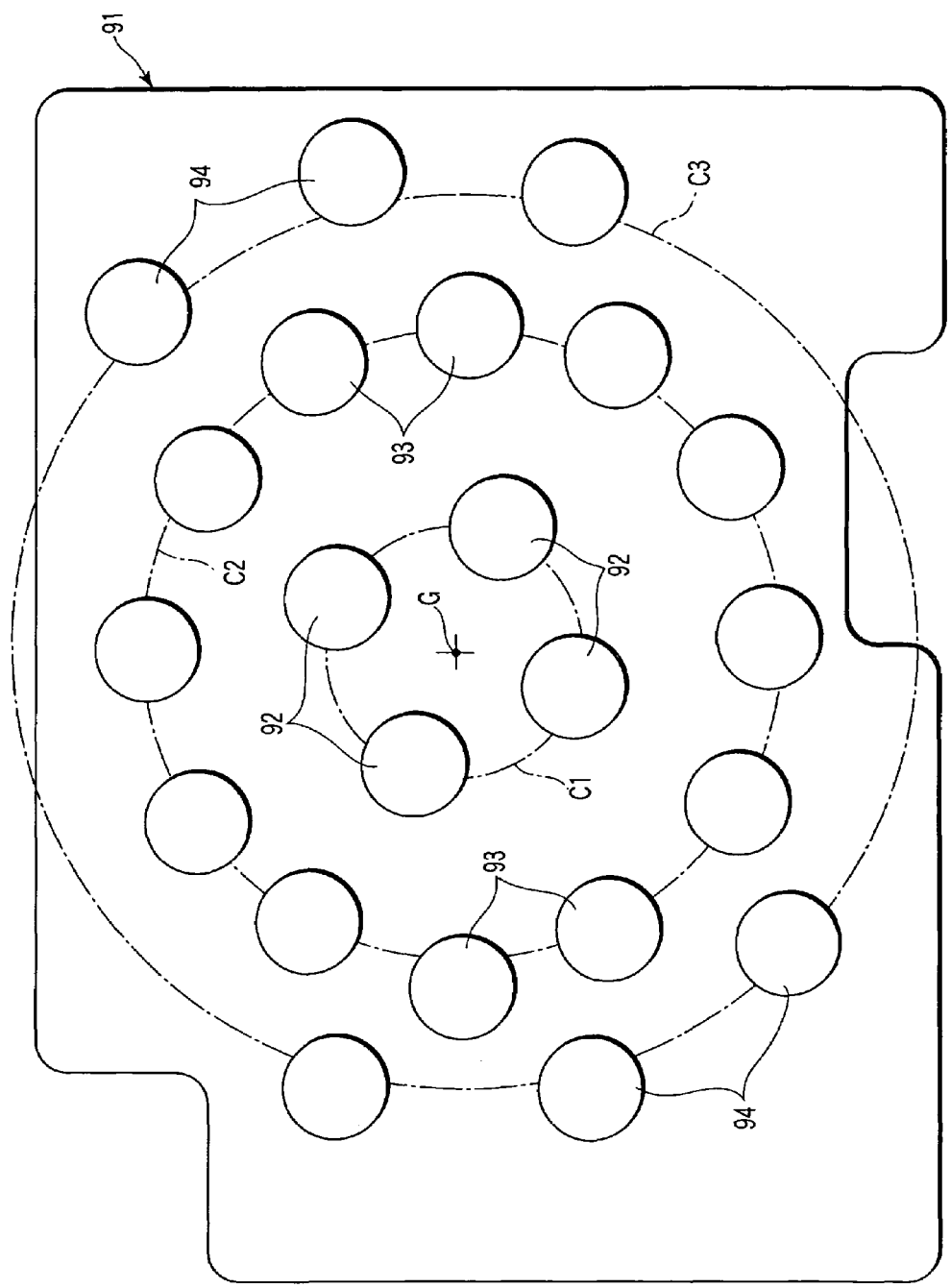
FIG. 11 is a plan view of a reinforcing plate according to the fifth embodiment of the present invention.

FIG. 11 shows a reinforcing plate 91 according to a fifth embodiment of the present invention.

The reinforcing plate 91 is formed of a metal material such as an aluminum alloy. An outer shape of the reinforcing plate 91 is similar to that of the reinforcing plate 45 of the first embodiment. The reinforcing plate 91 has the center of gravity G at its central portion. The reinforcing plate 91 includes a plurality of first opening portions 92 surrounding the center of gravity G, a plurality of second opening portions 93 surrounding the first opening portions 92, and a plurality of third opening portions 94 surrounding the second opening portions 93.

The first opening portions 92 are located in a first concentric circle C1 having the center of gravity G as its center, and are spaced with an interval. The second opening portions 93 are located in a second concentric circle C2 having the center of gravity G as its center, and are spaced with an interval. A radius of the second concentric circle C2 is longer than that of the first concentric circle C1. The third opening portions 94 are located in a third concentric circle C3 having the center of gravity G as its center, and are spaced with an interval. A radius of the third concentric circle C3 is longer than that of the second concentric circle C2.

In this structure, the reinforcing plate 91 is lightweight since it has the opening portions 92 to 94. Moreover, the opening portions 92 to 94 are displaced from the center of gravity G which is located at the central portion of the reinforcing plate 91. For this reason, the rigidity of the reinforcing plate 91 can be maintained and the impulse applied to the reinforcing plate 91 can be overcome by the rigidity.

Figure 12:
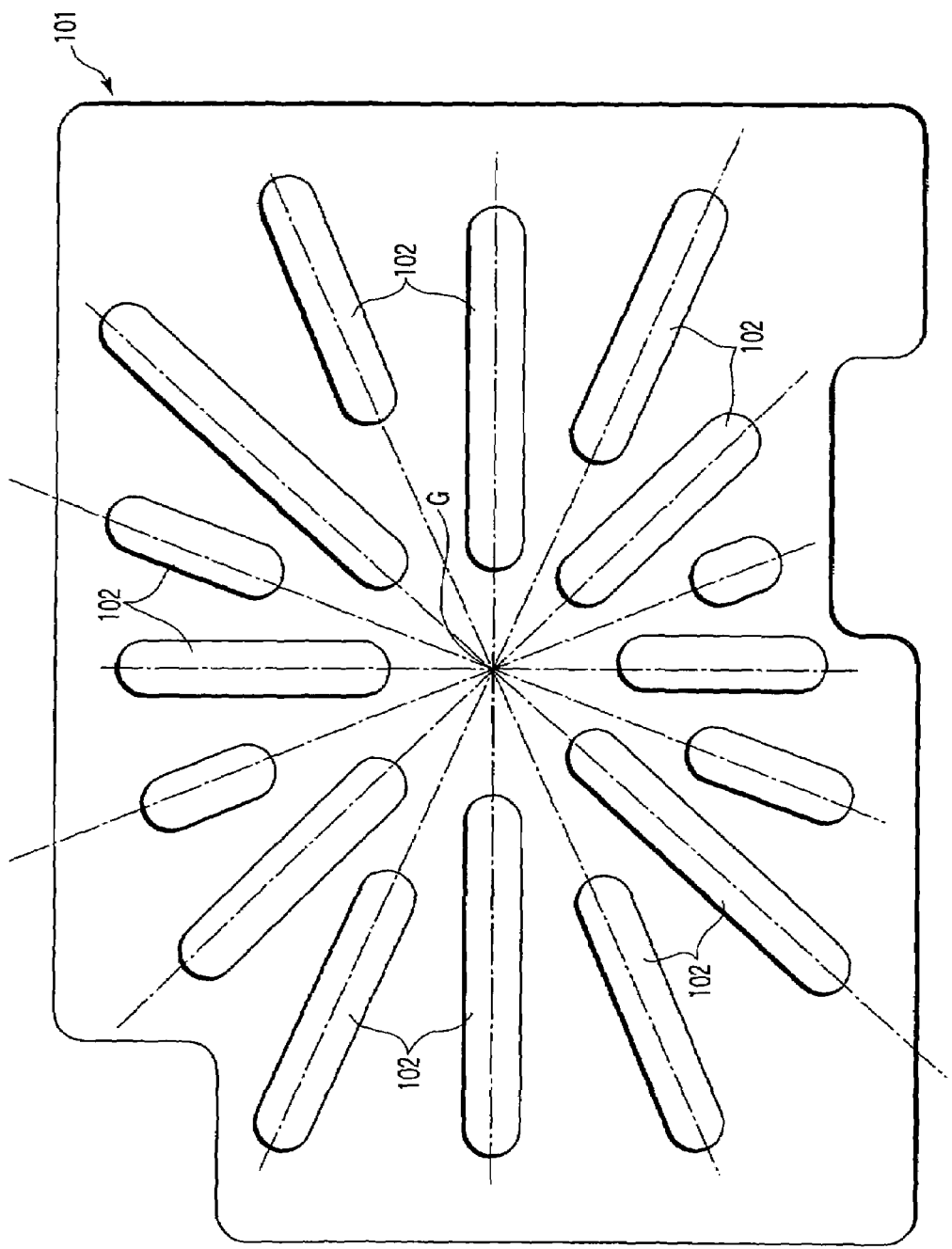
FIG. 12 is a plan view of a reinforcing plate according to the sixth embodiment of the present invention.

FIG. 12 shows a reinforcing plate 101 according to a sixth embodiment of the present invention.

The reinforcing plate 101 is formed of a metal material such as an aluminum alloy. An outer shape of the reinforcing plate 101 is similar to that of the reinforcing plate 91 of the fifth embodiment. The reinforcing plate 101 has the center of gravity G at its central portion. The reinforcing plate 101 includes a plurality of opening portions 102 surrounding the center of gravity G. Each of the opening portions 102 is shaped in a slit. The opening portions 102 are extended radially from the central portion of the reinforcing plate 101 having the center of gravity G.

In this structure, the reinforcing plate 101 is lightweight since it has the slit-shaped opening portions 102. Moreover, the opening portions 102 are displaced from the center of gravity G which is located at the central portion of the reinforcing plate 101. For this reason, the rigidity of the reinforcing plate 101 can be maintained and the impulse applied to the reinforcing plate 101 can be overcome by the rigidity.

The electronic apparatus of the present invention is not limited to a portable computer, but can be widely applied to, for example, a PDA, a mobile telephone, an electronic notebook, a digital camera and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a housing having a mounting portion, the mounting portion including a bottom wall comprising an inner surface facing an inner side of the housing;
   an input device placed on the mounting portion; and
   a reinforcing plate configured to reinforce the mounting portion, the reinforcing plate being stacked on the inner surface of the bottom wall, and the bottom wall being placed between the input device and the reinforcing plate,
   wherein the reinforcing plate has a frame and coupling portions surrounded by the frame, the coupling portions pass through a center of gravity of the reinforcing plate and a plurality of opening portions are provided between the frame and the coupling portions.

2. The electronic apparatus according to claim 1, wherein the bottom wall includes an opening portion opening toward the inner side of the housing, and the reinforcing plate is fitted in the opening portion.

3. The electronic apparatus according to claim 1, wherein the opening portions of the reinforcing plate are arranged radially from the center of gravity of the reinforcing plate.

4. The electronic apparatus according to claim 1, wherein the housing accommodates a disk drive, the reinforcing plate is located to face the disk drive and a gap is provided between the reinforcing plate and the disk drive.

5. The electronic apparatus according to claim 1, wherein the housing is formed of synthetic resin and the reinforcing plate is formed of metal.

6. An electronic apparatus comprising:
   a housing including an upper casing and a lower casing, the upper casing including a mounting portion being a recessed area of the upper casing, the mounting portion including a bottom wall and a plurality of side walls extending from the bottom wall;
   a keyboard including a plurality of keys and a keyboard base, the keyboard base positioned on the bottom wall of the mounting portion; and
   a reinforcing plate configured to reinforce the bottom wall of the mounting portion with the bottom wall positioned between the keyboard base and the reinforcing plate, the reinforcing plate including a frame and coupling portions surrounded by the frame, the coupling portions pass through a center of gravity of the reinforcing plate and a plurality of opening portions are provided between the frame and the coupling portions.

7. The electronic apparatus according to claim 6, wherein the reinforcing plate is attached to an inner surface of the bottom wall, the inner surface of the bottom wall facing the lower casing and toward an interior of the housing.

8. The electronic apparatus according to claim 6, wherein the reinforcing plate is positioned between the bottom wall of the mounting portion and a disk drive placed within the housing.

9. The electronic apparatus according to claim 6, wherein the coupling portions of the reinforcing plate are arranged radially from the center of gravity of the reinforcing plate.

10. The electronic apparatus according to claim 6, wherein the reinforcing plate including a plurality of openings formed by projecting portions projecting from a back surface of the reinforcing plate.

11. The electronic apparatus according to claim 6, wherein the coupling portions of the reinforcing plate are arranged with a first plurality of openings positioned linear to each other along a first opening region and a second plurality of openings positioned linear to each other along a second opening region.

12. The electronic apparatus according to claim 11, wherein the first plurality of openings includes at least four openings and the second plurality of openings includes at least four openings.

13. The electronic apparatus according to claim 6, wherein the reinforcing plate is positioned between the bottom wall of the mounting portion and a battery pack placed within the housing.

* * * * *